United States Patent
Kuno et al.

(10) Patent No.: US 12,220,875 B2
(45) Date of Patent: Feb. 11, 2025

(54) WATER-SOLUBLE SUPPORT MATERIAL FORMULATION USABLE IN ADDITIVE MANUFACTURING

(71) Applicant: Stratasys Ltd., Rehovot (IL)

(72) Inventors: Lev Kuno, Tzur-Hadassah (IL); Dani Peri, Rehovot (IL); Uri Zadok, Herzliya (IL); Jankiel Kimelblat, RaAnana (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 18/574,829

(22) PCT Filed: Jun. 30, 2022

(86) PCT No.: PCT/IL2022/050705
§ 371 (c)(1),
(2) Date: Dec. 28, 2023

(87) PCT Pub. No.: WO2023/275877
PCT Pub. Date: Jan. 5, 2023

(65) Prior Publication Data
US 2024/0269936 A1    Aug. 15, 2024

Related U.S. Application Data

(60) Provisional application No. 63/216,684, filed on Jun. 30, 2021.

(51) Int. Cl.
*B29C 64/40* (2017.01)
*B29C 64/112* (2017.01)
(Continued)

(52) U.S. Cl.
CPC ............ *B29C 64/40* (2017.08); *B29C 64/112* (2017.08); *B33Y 10/00* (2014.12); *B33Y 70/00* (2014.12);
(Continued)

(58) Field of Classification Search
None
See application file for complete search history.

(56) References Cited

U.S. PATENT DOCUMENTS

| 6,569,373 B2 | 5/2003 | Napadensky |
| 7,183,335 B2 | 2/2007 | Napadensky |

(Continued)

FOREIGN PATENT DOCUMENTS

| CN | 107097414 | 8/2017 |
| CN | 107533296 | 1/2018 |

(Continued)

OTHER PUBLICATIONS

International Preliminary Report on Patentability Dated Jan. 11, 2024 From the International Bureau of WIPO Re. Application No. PCT/IL2022/050705 (7 Pages).

(Continued)

*Primary Examiner* — Jeffrey M Wollschlager

(57) ABSTRACT

A support material formulation for use in additive manufacturing of a three-dimensional object, which, when hardened, is soluble upon immersion in water, is provided. The formulation includes a hydrophilic curable mono-functional material; a polyol (e.g., a branched polyol) having a molecular weight lower than 1,000, or lower than 800 grams/mol; and a polyester material having a molecular weight higher than 400, or higher than 500, grams/mol. Additive manufacturing using the disclosed formulation and objects made thereby are also provided.

19 Claims, 7 Drawing Sheets

(51) Int. Cl.
- *B29K 67/00* (2006.01)
- *B29K 105/00* (2006.01)
- *B33Y 10/00* (2015.01)
- *B33Y 70/00* (2020.01)
- *C09D 11/101* (2014.01)
- *C09D 11/104* (2014.01)
- *C09D 11/38* (2014.01)

(52) U.S. Cl.
CPC .......... *C09D 11/101* (2013.01); *C09D 11/104* (2013.01); *C09D 11/38* (2013.01); *B29K 2067/00* (2013.01); *B29K 2105/0005* (2013.01); *B29K 2105/0088* (2013.01); *B29K 2995/0062* (2013.01); *B29K 2995/0092* (2013.01)

(56) References Cited

U.S. PATENT DOCUMENTS

| | | | |
|---|---|---|---|
| 7,479,510 | B2 | 1/2009 | Napadensky et al. |
| 2003/0207959 | A1 | 11/2003 | Napadensky et al. |
| 2017/0240751 | A1* | 8/2017 | Morikawa ............ C09D 11/102 |
| 2017/0266889 | A1* | 9/2017 | Takahashi ............ B29C 64/112 |
| 2019/0233634 | A1* | 8/2019 | Ota ............................ C08F 2/44 |
| 2020/0284787 | A1* | 9/2020 | Cabrera Carrasco ........................ G01N 33/553 |

FOREIGN PATENT DOCUMENTS

| | | |
|---|---|---|
| WO | WO 2016/142947 | 9/2016 |
| WO | WO 2017/029657 | 2/2017 |
| WO | WO 2017/050604 | 3/2017 |
| WO | WO 2017/122211 | 7/2017 |
| WO | WO 2018/055521 | 3/2018 |
| WO | WO 2018/055522 | 3/2018 |
| WO | WO 2019/130321 | 7/2019 |
| WO | WO 2023/275877 | 1/2023 |

OTHER PUBLICATIONS

International Search Report and the Written Opinion Dated Sep. 26, 2022 From the International Searching Authority Re. Application No. PCT/IL2022/050705. (14 Pages).

Notification of Office Action and Search Report Dated Aug. 30, 204 From the State Intellectual Property Office of the People's Republic of China Re. Application No. 202280058870.7. and Its Translation of Office Action into English.

* cited by examiner

WATER-SOLUBLE SUPPORT MATERIAL FORMULATION USABLE IN ADDITIVE MANUFACTURING

RELATED APPLICATIONS

This application is a National Phase of PCT Patent Application No. PCT/IL2022/050705 having International filing date of Jun. 30, 2022, which claims the benefit of priority under 35 USC § 119 (e) of U.S. Provisional Patent Application No. 63/216,684, filed on Jun. 30, 2021.

PCT Patent Application No. PCT/IL2022/050705 is also related to U.S. Provisional Patent Application No. 63/216,702, filed on Jun. 30, 2021.

PCT Patent Application No. PCT/IL2022/050705 was co-filed on Jun. 30, 2022 with PCT Patent Application No. PCT/IL2022/050706 entitled "DISPOSAL OF WATER SOLUBLE WASTE IN ADDITIVE MANUFACTURING", which claims the benefit of priority under 35 USC § 119 (e) of U.S. Provisional Patent Application No. 63/216,702, filed on Jun. 30, 2021.

The contents of the above applications are all incorporated by reference as if fully set forth herein in their entirety.

FIELD AND BACKGROUND OF THE INVENTION

The present invention, in some embodiments thereof, relates to additive manufacturing (AM), and more particularly, but not exclusively, to curable formulations that form a water-soluble support material in additive manufacturing such as three-dimensional inkjet printing, and to methods of additive manufacturing utilizing same.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layer-wise manner.

Various AM technologies exist, amongst which are stercolithography, digital light processing (DLP), and three-dimensional (3D) printing, 3D inkjet printing in particular. Such techniques are generally performed by layer by layer deposition and solidification of one or more building materials, typically photopolymerizable (photocurable) materials.

In three-dimensional printing processes, for example, a building material is dispensed from a print head having a set of nozzles to deposit layers on a supporting structure. Depending on the building material, the layers may then solidify, harden or cured, optionally using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in additive manufacturing may include a receiving medium and one or more print heads. The receiving medium can be, for example, a fabrication tray that may include a horizontal surface to carry the material dispensed from the print head. The print head may be, for example, an ink jet head having a plurality of dispensing nozzles arranged in an array of one or more rows along the longitudinal axis of the print head. The print head may be located such that its longitudinal axis is substantially parallel to the indexing direction. The printing system may further include a controller, such as a microprocessor to control the printing process, including the movement of the print head according to a pre-defined scanning plan (e.g., a CAD configuration converted to a Stereo Lithography (STL) format and programmed into the controller). The print head may include a plurality of jetting nozzles. The jetting nozzles dispense material onto the receiving medium to create the layers representing cross sections of a 3D object.

In addition to the print head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently harden or solidify, typically upon exposure to curing condition, typically curing energy (e.g., UV curing), to form the required layer shape. After printing completion, support structures are removed to reveal the final shape of the fabricated 3D object.

Known methods for removal of support materials include mechanical impact, which is typically applied by a tool or water-jet, as well as chemical methods, such as dissolution in a solvent, with or without heating. The mechanical methods are labor, intensive and are often unsuited for small intricate parts.

For dissolving the support materials, the fabricated object is often immersed in water or in a solvent that is capable of dissolving the support materials. The solutions utilized for dissolving the support material are also referred to herein and in the art as "cleaning solutions". In many cases, however, the support removal process may involve hazardous materials, manual labor and/or special equipment requiring trained personnel, protective clothing and expensive waste disposal. In addition, the dissolution process is usually limited by diffusion kinetics and may require very long periods of time, especially when the support constructions are large and bulky.

Furthermore, post-processing may be necessary to remove traces of a 'mix layer' on object surfaces. The term "mix layer" refers to a residual layer of mixed hardened model and support materials formed at the interface between the two materials on the surfaces of the object being fabricated, by model and support materials mixing into each other at the interface between them. Such a hardened mixture ("mix layer") at a surface of an object may have a relatively non-reflective appearance, and is commonly referred to as "matte"; whereas surfaces lacking such a hardened mixture (e.g., wherein support material formulation was not applied thereon) are commonly referred to as "glossy" in comparison.

Both mechanical and dissolution methods for removal of support materials are especially problematic for use in an office environment, where case-of-use, cleanliness and environmental safety are major considerations.

Water-soluble materials for 3D printing have been previously described. U.S. Pat. No. 6,228,923, for example, describes a water soluble thermoplastic polymer—Poly(2-ethyl-2-oxazoline)—for use as a support material in a 3D building process involving high pressure and high temperature extrusion of ribbons of selected materials onto a plate.

A water-containing support material comprising a fusible crystal hydrate is described in U.S. Pat. No. 7,255,825.

Compositions suitable for support in building a 3D object are described, for example, in U.S. Pat. Nos. 7,479,510, 7,183,335 and 6,569,373, all to the present Assignee. Generally, the compositions disclosed in these patents comprise at least one UV curable (reactive) component, e.g., an acrylic component, at least one non-UV curable component, e.g. a polyol or glycol component, and a photoinitiator. After irradiation, these compositions provide a semi-solid or gel-like material capable of dissolving upon exposure to water, to an alkaline or acidic solution or to a water detergent solution. 3D printing methodologies using such a soluble support material are also known as "Soluble Support Technology" or SST, and the support material formulation is often referred to a "soluble support material" or "soluble support material formulation". Soluble support materials should beneficially feature sufficient water solubility, so as to be removed during a relatively short time period, or sufficient solubility in a non-hazardous cleaning solution, yet, at the same, to exhibit mechanical properties sufficient to support the printed object during the additive manufacturing process.

In order to be compatible with most of the commercially-available print heads utilized in a 3D inkjet printing system, the uncured building material should feature the following characteristics: a relatively low viscosity (e.g., Brookfield Viscosity of up to 150 cps, or up to 100 cps, or up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring boiling point lower than 200° C. or lower than 190° C., yet characterized preferably by low evaporation rate at the working (e.g., jetting) temperature, and, if the building material includes solid particles, these should feature an average size of no more than 2 microns.

Additional background art includes WO 2017/050604, WO 2018/055522 and WO 2018/055521, all by the present assignee.

Additional Background art includes U.S. Patent Application having Publication No. 2003/0207959; and PCT International Patent Applications having Publication Nos. WO 2016/142947; WO 2017/029657; and WO 2017/122211.

Additional support material formulations are described, for example, in WO 2016/142947; WO 2017/029657; and WO 2019/130321.

SUMMARY OF THE INVENTION

According to an aspect of some embodiments of the present invention there is provided a support material formulation usable in, or being for use in, additive manufacturing of a three-dimensional object, the formulation comprising:

a hydrophilic curable mono-functional material;

a polyol having a molecular weight lower than 1,000, or lower than 800 grams/mol; and a polyester material having an average molecular weight higher than 400, or higher than 500, grams/mol.

According to some of any of the embodiments described herein, an amount of the polyester material is no more than 25% by weight of the total weight of the formulation.

According to some of any of the embodiments described herein, an amount of the polyester material ranges from 10 to 20% by weight of the total weight of the formulation.

According to some of any of the embodiments described herein, the polyester material is liquid at room temperature or is soluble in the formulation at room temperature.

According to some of any of the embodiments described herein, the polyester material is or comprises a polycaprolactone.

According to some of any of the embodiments described herein, the polyol is a branched polyol.

According to some of any of the embodiments described herein, an average molecular weight of the polyol ranges from 500 to 900, or from 500 to 800, or from 600 to 800, grams/mol.

According to some of any of the embodiments described herein, an amount of the polyol ranges from 30 to 60, or from 30 to 50, or from 35 to 45, % by weight of the total weight of the formulation.

According to some of any of the embodiments described herein, the polyol is a branched poly(alkylene glycol), for example, a branched poly(propylene glycol).

According to some of any of the embodiments described herein, a weight ratio of the polyol to the polyester material is no more than 4:1 or no more than 3:1.

According to some of any of the embodiments described herein, a weight ratio of the polyol to the polyester material ranges from about 3:1 to about 2:1.

According to some of any of the embodiments described herein, the hydrophilic curable material is a photocurable material.

According to some of any of the embodiments described herein, the support material formulation further comprises a photoinitiator.

According to some of any of the embodiments described herein, an amount of the photoinitiator ranges from 0.5 to 3% by weight of the total weight of the formulation.

According to some of any of the embodiments described herein, the support material formulation further comprises a surface active agent.

According to some of any of the embodiments described herein, the support material formulation further comprises a polymerization inhibitor.

According to some of any of the embodiments described herein, the support material formulation is characterized as providing a hardened material that is dissolvable when immersed in static water at room temperature.

According to some of any of the embodiments described herein, the support material formulation is for use, or is usable, in any manufacturing of three-dimensional objects, or in any additive manufacturing processes, including, but not limited to, 3D material jetting and 3D inkjet printing.

3D material jetting encompasses any inkjet printing, nanoparticle jetting, drop on demand, and like methodologies where a use of s support material formulation is applicable or advantageous.

According to an aspect of some embodiments of the present invention there is provided a method of manufacturing a three-dimensional object, the method comprising: receiving three-dimensional printing data corresponding to the shape of the object; and dispensing droplets of an uncured building material in layers, on a receiving medium, using at least one inkjet printing head, according to the printing data, the uncured building material comprising at least one modeling material formulation and at least one support material formulation, the support material formulation being a formulation as described herein in any of the respective embodiments and any combination thereof.

According to some of any of the embodiments described herein, the method further comprises, subsequent to the dispensing, exposing the layers to a curing condition, to thereby provide a hardened modeling material and a hardened support material.

According to some of any of the embodiments described herein, the method further comprises, removing the hardened support material.

According to some of any of the embodiments described herein, removing the hardened support material is by immersion in static water.

According to some of any of the embodiments described herein, removing the hardened support material is by immersion in circulating water.

According to some of any of the embodiments described herein, removing the hardened support material is by immersion in a water bath and applying sonication to the water bath.

According to some of any of the embodiments described herein, removing the hardened support material is by dishwashing (e.g., by placing the object in a dishwasher), preferably using detergent-free water.

According to some of any of the embodiments described herein, there is provided a three-dimensional object, obtainable by the methods as described herein in any of the respective embodiments and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention.

DESCRIPTION OF SPECIFIC EMBODIMENTS OF THE INVENTION

Figure 1A:
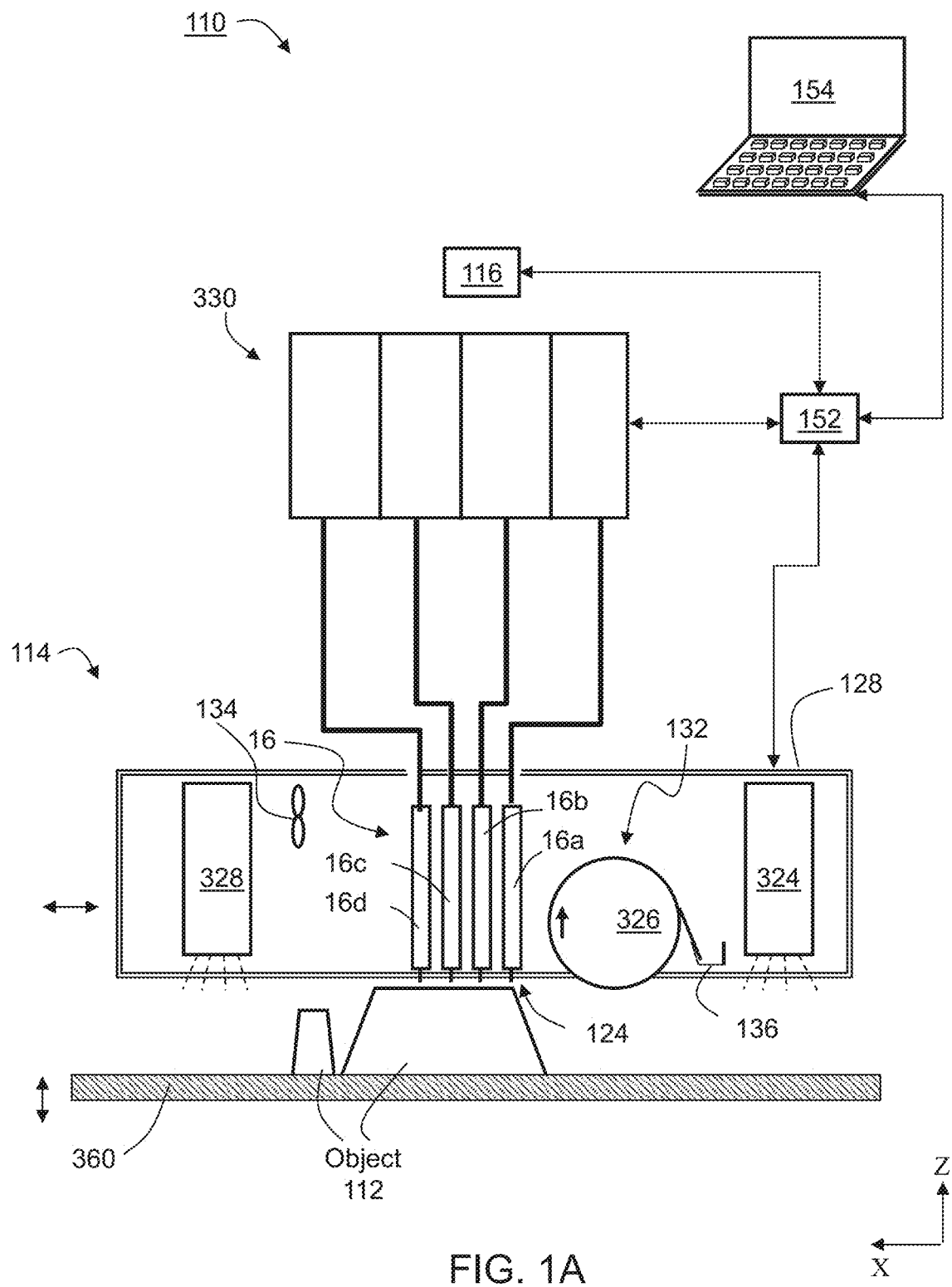

The present invention, in some embodiments thereof, relates to additive manufacturing (AM), and more particularly, but not exclusively, to curable formulations that form a water-soluble support material in additive manufacturing such as three-dimensional inkjet printing, and to methods of additive manufacturing utilizing same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, support materials are often used in additive manufacturing such as 3D inkjet printing for ensuring successful manufacturing of objects that feature voids, overhangs, bridges, etc.

Thus a building material (uncured) that comprises the modeling material formulation and the support material formulation is dispensed during the manufacturing process, and then hardened, to provide a hardened support material, where required, and a hardened model material featuring the shape of the desired object.

Removal of hardened support material reveals a hardened mixed layer, comprising a hardened mixture of support material and modeling material formulation. Such a hardened mixture at a surface of an object typically has a relatively non-reflective appearance, and is also known as a "matte" surface; whereas surfaces lacking such a hardened mixture (e.g., wherein support material formulation was not applied thereon) are known as "glossy". The difference in the appearance of the matte and glossy surfaces of an object results in a non-uniform appearance.

One way to overcome these limitations, for providing an object that features a uniform appearance, is to cover the entire object with a support material. This technical solution however is both laborious, costly, may adversely affect the final object, and results in objects featuring a matte appearance as described herein, and thus may require post-process treatment such as polishing to achieve a desired appearance.

The present inventors have now designed and successfully practiced novel water-soluble support formulations which, when forming a mix layer (a matte mode) and after being removed, provide a model part that features an appearance that is substantially similar to parts of the object that were not in contact with a support material (a glossy mode).

Embodiments of the present invention therefore relate to novel support material formulations which are usable in additive manufacturing such as 3D inkjet printing, and to additive manufacturing utilizing these formulations.

Herein throughout, the term "object" describes a final product of the additive manufacturing. This term refers to the product obtained by a method as described herein, after removal of the support material. The "object" therefore essentially consists (at least 95 weight percent) of a hardened (e.g., cured) modeling material.

Herein throughout, the term "object" or "printed object" or "fabricated object" describes a product of an additive manufacturing process. This term refers to the product obtained by a method as described herein, before removal of the cured support material. A printed object is therefore made of hardened (e.g., cured) modeling material and hardened (e.g., cured) support material, or, collectively, of a hardened building material.

The term "printed object" as used herein throughout refers to a whole printed object or a part thereof.

The term "model", as used herein, describes a final product of the manufacturing process. This term refers to the product obtained by a method as described herein, after removal of the support material. The model therefore essentially consists of a cured modeling material, unless otherwise indicated. This term is also referred to herein as "model object", "final object" or simply as "object".

The terms "model", "model object", "final object" and "object", as used herein throughout, refer to a whole object or a part thereof.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "modeling material formulation", which is also referred to herein interchangeably as "modeling formulation" or simply as "formulation", describes a part of the uncured building material which is dispensed so as to form the model object, as described herein. The modeling formulation is an uncured modeling formulation, which, upon exposure to curing energy, forms the final object or a part thereof.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "support material formulation", which is also referred to herein interchangeably as "support formulation", describes a part of the uncured building material which is dispensed so as to form the support material, as described herein. The support material formulation is an uncured formulation, which, upon exposure to curing energy, forms the hardened support material.

Herein throughout, the phrases "cured modeling material" and "hardened modeling material", which are used interchangeably, describe the part of the building material that forms a model object, as defined herein, upon exposing the dispensed building material to curing, and following removal of the cured support material, if present. The cured modeling material can be a single cured material or a mixture of two or more cured materials, depending on the modeling material formulations used in the method, as described herein.

Herein throughout, the phrase "hardened support material" is also referred to herein interchangeably as "cured support material" or simply as "support material" and describes the part of the hardened (cured) building material that is intended to support the fabricated final object during the fabrication process, and which is removed once the process is completed and a hardened modeling material is obtained.

In some of any of the embodiments described herein, an uncured formulation (of a building material, a support material and a modeling material) is typically a curable formulation, which forms a hardened material upon curing.

Herein throughout, the term "curable formulation" describes a mixture of materials which, when exposed to curing energy, as described herein, solidifies or hardens to form a cured material as defined herein. Curable formulations comprise one or more curable materials, and may optionally further comprise one or more non-curable materials, initiators, and other additives.

The formulations forming the building material (modeling material formulations and support material formulations) comprise one or more curable materials, which, when exposed to a curing condition, form hardened (cured) material.

Herein throughout, a "curable material" is a compound (typically a monomeric or oligomeric compound, yet optionally a polymeric material) which, when exposed to a curing condition, as described herein, solidifies or hardens to form a cured material. Curable materials are typically polymerizable materials, which undergo polymerization and/or cross-linking when exposed to a suitable curing condition (e.g., a suitable energy source).

Herein, the phrases "exposing to a curing energy", "exposing to curing", "exposing to curing conditions" and "exposing to an energy source that affects curing", and grammatical diversions thereof, are used interchangeably, and mean that dispensed layers of uncured building material are exposed to the curing energy and the exposure is typically performed by applying a curing energy to the dispensed layers.

A "curing energy" typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifyable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., radiation), it hardens (undergoes curing) by any one, or combination, of chain elongation and cross-linking.

In some of any of the embodiments described herein, a curable material is a monomer or a mixture of monomers which can form a polymeric material upon a polymerization reaction, when exposed to a curing condition (e.g., curing energy) at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

In some of any of the embodiments described herein, a curable material, whether monomeric or oligomeric or polymeric, can be a mono-functional curable material or a multi-functional curable material.

Herein, a mono-functional curable material comprises one functional group that can undergo polymerization when exposed to a curing condition (e.g., curing energy such as radiation).

A multi-functional curable material comprises two or more, e.g., 2, 3, 4 or more, functional groups that can undergo polymerization when exposed to a curing condition (e.g., curing energy). Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to a curing condition (e.g., curing energy) and/or act as cross-linkers.

Herein throughout, whenever the phrase "weight percent" is indicated in the context of embodiments of a curable formulation, it is meant weight percent of the total weight of the formulation as described herein.

The phrase "weight percent" is also referred to herein as "% by weight" or "% wt." or "wt. %".

Embodiments of the present invention relate to novel support material formulations which are usable in additive manufacturing of three-dimensional objects.

According to some of any of the embodiments described herein, the support material formulations feature a viscosity of no more than 150 centipoises, or no more than 100 centipoises, or no more than 50 centipoises (cPs or cps) at a jetting temperature which is typically comprised between 50° C. and 100° C., for instance 70° C., where the viscosity is determined according to standard procedures known in the art and/or as described in the Examples section that follows.

Embodiments of the present invention further relate to kits in which the novel support material formulations disclosed herein are packaged.

Embodiments of the present invention further relate to a method of additive manufacturing a three-dimensional object using the support material formulations described herein.

The method of the present embodiments manufactures three-dimensional objects in a layer-wise manner by forming a plurality of layers in a configured pattern corresponding to the shape of the objects, as described herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s) and one or more support material formulations, as described herein, and exposing the dispensed modeling material to a curing condition (e.g., curing energy) to thereby form a printed object, as described in further detail hereinafter.

The final three-dimensional object is made of the modeling material or a combination of modeling materials or a combination of modeling material/s and support material/s or modification thereof (e.g., following curing and removal of the hardened support material). All these operations are well-known to those skilled in the art of solid freeform fabrication.

The Support Material Formulation:

According to an aspect of some embodiments of the present invention there is provided a support material formulation for use in additive manufacturing of a three-dimensional object.

According to some of any of the embodiments described herein, the support material formulation comprises: one or more hydrophilic curable mono-functional material(s), as described herein in any of the respective embodiments; a polyol as described herein in any of the respective embodiments; and a polyester material as described herein in any of the respective embodiments.

Polyol:

Herein and in the art, the term "polyol" describes a polymeric material that features two or more free hydroxy groups, typically from about 10 to dozens or hundreds free hydroxy groups. Representative examples of a polyol include, without limitation, a polyester polyol, a polyether polyol and a urethane polyol. Preferably, the polyol is a polyether polyol such as, for example, a poly(alkylene glycol).

The polyol can be a linear polyol or a non-linear (e.g., branched polyol).

According to some of any of the embodiments described herein, the polyol is a branched polyol.

By "branched polyol" it is meant a polyol material as defined herein, which features three or more terminal free hydroxy groups, meaning that it is composed of at least three, possible, at least 4, 5, 6 or more, interconnected (covalently) polymeric chains, each terminating by a free hydroxy group. One or more, or all, of the polymeric chains can further feature free hydroxy groups as pendant groups. In exemplary branched polyols, the three or more polymeric chains extend from a branching unit, as described herein. In exemplary embodiments, the branching unit is aliphatic.

According to some of any of the embodiments described herein, the polyol is a poly(alkylene glycol), for example, a poly(ethylene glycol) or a poly(propylene glycol) or a mixture thereof. In some embodiments, the polyol is or comprises a poly(propylene glycol).

According to some of any of the embodiments described herein, the polyol has an average molecular weight lower than 1,000, or lower than 800 grams/mol.

The polyol can have an average molecular weight that ranges from about 400 to about 1,000, or from about 400 to about 900, or from about 400 to about 800, or from about 500 to about 1000, or from about 500 to about 900, or from about 500 to about 800, or from about 600 to about 1000, or from about 600 to about 900, or from about 600 to about 800, or of about 700 grams/mol, including any intermediate values and subranges therebetween.

According to some of any of the embodiments described herein, the branched polyol is a branched poly(alkylene glycol), for example, a branched poly(ethylene glycol) or a branched poly(propylene glycol) or a mixture thereof. In some embodiments, the polyol is or comprises a branched poly(propylene glycol).

According to some of any of the embodiments described herein, the branched polyol has an average molecular weight lower than 1,000, or lower than 800 grams/mol.

The branched polyol can have an average molecular weight that ranges from about 400 to about 1,000, or from about 400 to about 900, or from about 400 to about 800, or from about 500 to about 1000, or from about 500 to about 900, or from about 500 to about 800, or from about 600 to about 1000, or from about 600 to about 900, or from about 600 to about 800, or of about 700 grams/mol, including any intermediate values and subranges therebetween.

According to some of any of the embodiments described herein, the polyol as described herein is water-miscible or water-soluble, as defined herein.

According to some of any of the embodiments described herein, an amount of the (e.g., branched) polyol ranges from 30 to 60, or from 30 to 50, or from 35 to 45, % by weight of the total weight of the formulation, including any intermediate values and subranges therebetween.

Polyester Material:

According to some of any of the embodiments described herein, the formulation comprises one or more polyester material(s), each can independently be linear or non-linear (e.g., branched).

By "polyester material" it is meant a chemical substance that features a polyester skeleton (e.g., a polyester backbone in which repeating units are linked to one another via an ester —C(=O)—O— moiety). The repeating backbone units of a polyester can very and typically depend on the starting monomeric material used to form the polyester. According to embodiments of the present invention, the polyester can optionally be substituted, (in addition to substituents that inherently form the polyester) either as pendant groups or as terminal groups.

According to some embodiments, the polyester material is or comprises a non-linear (e.g., branched) polyester.

A branched polyester can, in some embodiments, feature a branching unit from which polyester chains extend.

According to some of any of the embodiments described herein, the polyester material has an average molecular weight which is higher than 400, or higher than 500 grams/mol.

The polyester material can feature an average molecular weight of from about 400 to about 2000, or from about 400 to about 1500, or from about 400 to about 1200, from about 500 to about 2000, or from about 500 to about 1500, or from about 500 to about 1200, or from about 700 to about 1500, or from about 700 to about 1200, or from about 700 to about 1000, or from about 800 to about 1200, or from about 800 to about 1000, grams/mol, including any intermediate values and subranges therebetween, or of about 900 grams/mol.

According to some of any of the embodiments described herein, the polyester material is liquid at room temperature or is such that is dissolvable and/or stable in the formulation at room temperature (e.g., the polyester does not crystalize or precipitate in the formulation).

According to some of any of the embodiments described herein, the polyester material features one or more, preferably two or more free hydroxy groups, for example, is terminated by one, two or more free hydroxy groups.

An exemplary polyester material that has an average molecular weight as described herein and is liquid at room temperature and/or is dissolvable and/or stable in the formulation at room temperature, as described herein is a polycaprolactone or is a material that comprises a polycaprolactone. In exemplary embodiments, the polyester material is or comprises a linear or branched ε-polycaprolactone.

An exemplary polyester material is a linear ε-polycaprolactone, which can optionally be substituted (e.g., terminated) by one or more chemical groups, for example, hydroxy group(s), alkoxy group(s), carboxylate group(s), amide group(s), alkylene glycol group(s), and any combination thereof.

An exemplary polyester material is a non-linear polycaprolactone, for example, a branched ε-polycaprolactone, featuring an aliphatic or aromatic branching unit from which 3, 4, 5, or more polyester backbones extend. Such an exemplary polyester material preferably features one, two or more free chemical groups, e.g., as terminal groups, which can be, for example, hydroxy group(s), alkoxy group(s), carboxylate group(s), amide group(s), alkylene glycol group(s), and any combination thereof.

According to exemplary embodiments, the polyester material is a branched ε-polycaprolactone, featuring an aliphatic branching unit from which 3 polyester backbones, each terminating by a free hydroxy group, extend. An exemplary such a polyester material is marketed under the tradename CAPA®3091.

According to exemplary embodiments, the polyester material is a branched ε-polycaprolactone, featuring an aliphatic or aromatic branching unit from which 5 polyester backbones, each terminating by an alkylene glycol group, extend.

According to some of any of the embodiments described herein, the polyester material is a water-miscible or a water-soluble material, as defined herein.

According to some of any of the embodiments described herein, an amount of the polyester material is no more than 25% by weight of the total weight of the formulation. In some embodiments, an amount of the polyester material ranges from 10 to 20% by weight of the total weight of the formulation, including any intermediate values and subranges therebetween.

Mono-Functional Curable Material:

According to some of any of the embodiments described herein, the formulation comprises one or more mono-functional curable materials.

According to some of any of the embodiments described herein, one or more, or each, of the monofunctional curable material(s) is a hydrophilic material, as defined herein.

According to some of any of the embodiments described herein, one or more, or each, of the monofunctional curable material(s) is a water-miscible or water-soluble material, as defined herein.

Herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having Log P lower than 0.5, when Log P is determined in octanol and water phases, at a temperature lower than 50° C., or lower than 40° C., or lower than 35° C. or lower than 30° C., e.g., at 25° C.

Alternatively, hydrophilic compounds can be determined by, for example, the Hansen parameters, as having relative energy distance (RED) higher than 1, when calculated for interaction with water as a solvent, at a temperature lower than 50, or lower than 40° C., or lower than 35° C. or lower than 30° C., e.g., at 25° C.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

A hydrophilic mono-functional curable material according to some embodiments of the present invention can be a vinyl-containing compound represented by Formula I:

Formula I wherein at least one of $R_1$ and $R_2$ is and/or comprises a hydrophilic group, as defined herein.

The (=CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, —C(=O)—OR' group, and $R_2$ is hydrogen, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary monomeric mono-functional acrylate is acryloyl morpholine (ACMO).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a carboxylate and R' is a poly(alkylene glycol), as defined herein. An exemplary such hydrophilic monofunctional curable material is hexa(ethylene glycol) acrylate, (6-PEA).

In some embodiments, $R_1$ is a hydrophilic heteroalicyclic group, as defined herein. An exemplary such hydrophilic monofunctional curable material is ACMO.

In some embodiments, in case there are two or more monofunctional curable materials, all of the monofunctional curable materials are hydrophilic and/or water-soluble or water-miscible materials, and in some embodiments, only one of these materials is a hydrophilic and/or water-soluble or water-miscible material.

In some embodiments, one or more of the monofunctional curable materials provides, when hardened per se, a material that is water-soluble. An exemplary such material is ACMO.

In some embodiments, each of the monofunctional curable materials provides, when hardened per se, a material that is water-miscible or water-soluble.

According to some of any of the embodiments described herein, an amount of the hydrophilic mono-functional curable material ranges from about 30 to about 60, or from about 40 to about 60, or from about 40 to about 60, % by weight of the total weight of the formulation, including any intermediate values and subranges therebetween.

Exemplary Formulations:

According to some of any of the embodiments described herein, the support material formulation comprises:
one or more hydrophilic curable mono-functional material(s);
a branched polyol having a molecular weight lower than 1,000, or lower than 800 grams/mol, as described herein in any of the respective embodiments and any combination thereof; and
a polyester material having an average molecular weight higher than 400 or higher than 500, grams/mol, as described herein in any of the respective embodiments and any combination thereof.

According to some of any of the embodiments described herein, the support material formulation comprises:
one or more hydrophilic curable mono-functional material(s) represented by Formula I as described herein;
a branched poly(alkylene glycol) having a molecular weight lower than 1,000, or lower than 800 grams/mol, as described herein in any of the respective embodiments and any combination thereof; and
a polyester material having an average molecular weight higher than 400, or higher than 500, grams/mol, which is liquid at room temperature or is dissolvable and/or stable in the formulation at room temperature, as described herein in any of the respective embodiments and any combination thereof.

According to some of any of the embodiments described herein, the support material formulation comprises:
one or more hydrophilic curable mono-functional material(s) represented by Formula I as described herein;
a branched poly(alkylene glycol) having a molecular weight of from 500 to 800 grams/mol, as described herein in any of the respective embodiments and any combination thereof; and
a polyester material having an average molecular weight that ranges from about 600 grams/mol to about 1,000 grams/mol, which is liquid at room temperature or is dissolvable and/or stable in the formulation at room temperature and which features one or more free hydroxy groups, as described herein in any of the respective embodiments and any combination thereof.

According to some of any of the embodiments described herein, the support material formulation comprises:
one or more hydrophilic curable mono-functional material(s) represented by Formula I as described herein;
a branched poly(alkylene glycol), for example, a branched poly(propylene glycol) having a molecular weight of from 500 to 800 grams/mol, as described herein in any of the respective embodiments and any combination thereof; and
a branched polycaprolactone, for example, a branched poly-ε-caprolactone, having an average molecular weight that ranges from about 600 grams/mol to about 1,000 grams/mol, which is liquid at room temperature or dissolvable and/or stable in the formulation at room temperature and which features one or more free hydroxy groups, as described herein in any of the respective embodiments and any combination thereof.

According to some of any of the embodiments described herein, an amount of the hydrophilic mono-functional curable material(s) ranges from about 40 to about 60, or from about 40 to about 50, % by weight, of the total weight of the formulation, as described herein in any of the respective embodiments;
an amount of the polyol as described herein in any of the respective embodiments and any combination thereof, ranges from about 30 to about 50, or from about 35 to about 45, % by weight of the total weight of the formulation, as described herein in any of the respective embodiments; and an amount of the polyester material as described herein in any of the respective embodiments and any combination thereof ranges from about 10 to about 20, % by weight of the total weight of the formulation, as described herein in any of the respective embodiments.

According to some of any of the embodiments described herein, a weight ratio of the polyol to the polyester material is no more than 4:1 or no more than 3:1. According to some embodiments, the weight ratio of the polyol to the polyester material ranges from about 3:1 to about 2:1.

According to some of any of the embodiments described herein, a weight ratio of the hydrophilic mono-functional curable material(s) and the polyol ranges from about 2:1 to about 1:2, or from about 1.5:1 to about 1:1.5, or from about 1.2:1 to about 1:1.2.

According to some of any of the embodiments described herein, the formulation is devoid of multi-functional curable materials, or, if such materials are present, an amount thereof is no more than 10%, or no more than 5%, or no more than 2%, or no more than 1%, of the total weight of the formulation.

According to some of any of the embodiments described herein, the hydrophilic curable material is a photocurable material, for example, an acrylic material as represented by Formula I herein.

According to some of these embodiments, the formulation further comprises a photoinitiator.

In some of these embodiments, an amount of the photoinitiator ranges, for example, of from 0.5 to 3%, or from 1 to 3%, or from 0.5 to 2.5%, or from 0.5 to 2%, or from 1 to 2%, by weight, of the total weight of the formulation, including any intermediate values and subranges therebetween.

The photoinitiator can be a free radical photo-initiator, a cationic photo-initiator, or any combination thereof.

A free radical photoinitiator may be any compound that produces a free radical upon exposure to radiation such as ultraviolet or visible radiation and thereby initiates a polymerization reaction. Non-limiting examples of suitable photoinitiators include phenyl ketones, such as alkyl/cycloalkyl phenyl ketones, benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, and 1-hydroxycyclohexyl phenyl ketone (e.g., marketed as Irgacure® 184).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

Suitable cationic photoinitiators include, for example, compounds which form aprotic acids or Bronsted acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

In some of any of the embodiments described herein, the formulation may further comprise one or more additional agents that are beneficially used in the fabrication process. Such agents include, for example, surface active agents, inhibitors and stabilizers.

In some embodiments, a support material formulation as described herein comprises a surface active agent. A surface-active agent may be used to reduce the surface tension of the formulation to the value required for jetting or for other printing process, which is typically around 30 dyne/cm. An exemplary such agent is a silicone surface additive such as, but not limited to, surface agents marketed as the BYK family.

An amount of a surface active agent can range from about 0.01 to 0.2%, or from 0.01 to 1%, or from 0.05 to 1%, by weight, of the total weight of the formulation, including any intermediate values and subranges therebetween.

In some embodiments, a support material formulation as described herein further comprises an inhibitor, which inhibits pre-polymerization of the curable material during the fabrication process and before it is subjected to curing conditions. An exemplary stabilizer (inhibitor) is Tris(N-nitroso-N-phenylhydroxylamine) Aluminum Salt (NPAL). An amount of an inhibitor can range from about 0.01 to 5%, or from 0.01 to 3, or from 0.1 to 3%, or from 0.5 to 3%, or from 0.1 to 2%, or from 0.5 to 2.5%, or from 0.5 to 1.5%, by weight, of the total weight of the formulation, including any intermediate values and subranges therebetween.

Suitable stabilizers include, for example, thermal stabilizers, which stabilize the formulation at high temperatures.

According to some of any of the embodiments described herein, the support material formulation provides, when hardened (e.g., when exposed to a curing condition as described herein) a hardened support material that is water-miscible or water-soluble. According to some embodiments, the hardened support material is dissolvable when immersed in static or circulating water at room temperature for a period of from 1 to 48 hours, depending on the shape of the object.

Model Fabrication:

According to an aspect of some embodiments of the present invention there is provided a method of additive manufacturing a three-dimensional model object, which utilizes a formulation as described herein as support material formulation. The method is also referred to herein as a fabrication process or as a model fabrication process. In some embodiments, the method comprises dispensing an uncured building material so as to sequentially form a plurality of layers in a configured pattern corresponding to the shape of the object. In some embodiments, the (uncured) building material comprises one or more modeling material formulation(s) and one or more support material formulation(s), and one or more of the support material formulations is a formulation as described herein in any of the respective embodiments.

The modeling material formulation can be any modeling material formulation usable in additive manufacturing such as 3D inkjet printing, and is preferably curable under the same conditions at which the support material formulation is curable.

According to some embodiments of the present invention, the fabrication method is additive manufacturing of a three-dimensional model object.

According to some embodiments of this aspect, formation of each layer is effected by dispensing at least one uncured building material, and exposing the dispensed building material to a curing condition (e.g., a curing energy), to thereby form a cured building material, which is comprised of a cured modeling material and a cured support material.

According to some of any of the embodiments described herein, the additive manufacturing is preferably by three-dimensional inkjet printing.

The method of the present embodiments manufactures three-dimensional objects in a layer-wise manner by forming a plurality of layers in a configured pattern corresponding to the shape of the objects.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material (e.g., a modeling material formulation or a support material formulation) is to be delivered thereto. The decision is made according to a computer image of the surface.

When the AM is by three-dimensional printing, an uncured building material, as defined herein, is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials (e.g., a modeling formulation and/or a support formulation, as defined herein).

Figure 2A:
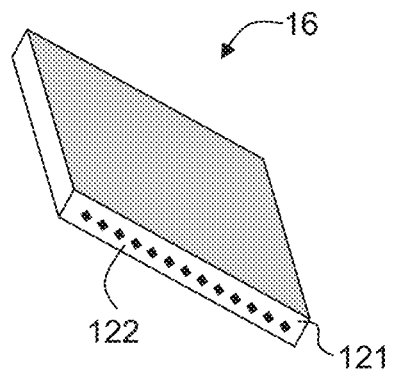
FIGS. 2A-2C are schematic illustrations of print heads according to some embodiments of the present invention.
Figure 2B:
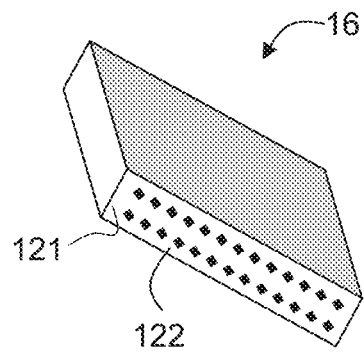
Figure 2C:
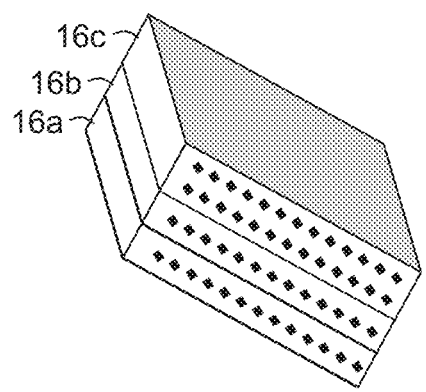

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises one or more arrays of nozzles 122, as illustrated in FIGS. 2A-C described below, through which a liquid building material 124 is dispensed.

According to some embodiments of the present invention, apparatus 114 operates at a temperature that does not exceed 50° C., or does not exceed 40° C., or does not exceed 35° C.

Preferably, but not obligatorily, apparatus 114 is a three-dimensional inkjet printing apparatus, in which case the dispensing heads are printing heads, and the building material is dispensed via inkjet technology from a printing head having one or more arrays of nozzles to deposit building material formulation in layers on a supporting structure. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles or arrays of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material is generally the same as the overall dispensing rate of the modeling material when all the arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

In some embodiments, the temperature control unit of at least a few of the arrays is configured so as not to exceed 45° C., or 40° C., or 35° C.

Apparatus 114 can further comprise a hardening device 324 which can include any device configured to emit light, heat or the like that may cause the deposited material to harden. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

As used herein, the term "dispensing head" or "depositing head" encompass printing heads which are dispensing heads usable in 3D printing such as 3D inkjet printing.

The dispensing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X—Y—Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layer-wise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 152 controls fabrication (e.g., printing) apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each dispensing head or nozzle array and the temperature of the building material in the respective printing head or respective nozzle array, as described herein.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
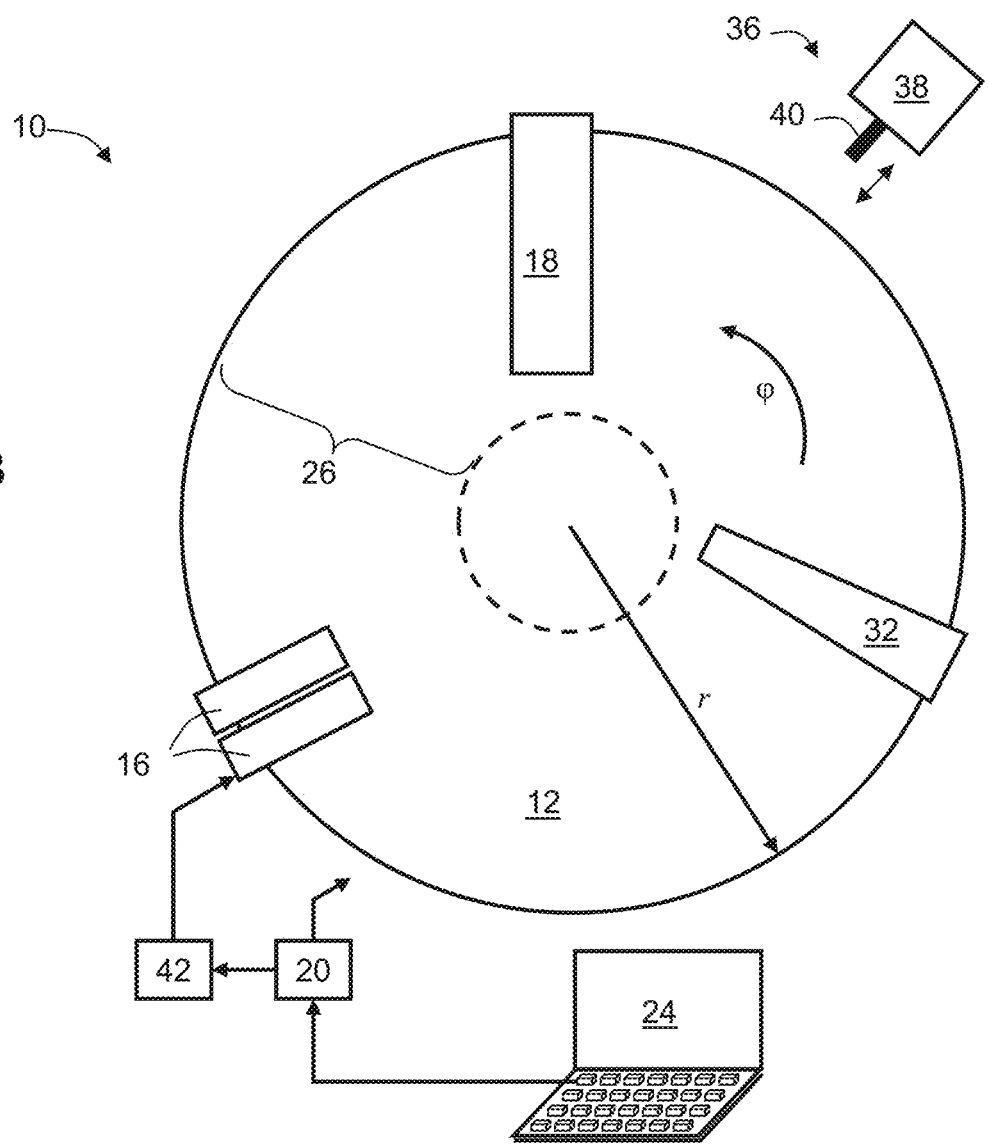
Figure 1C:
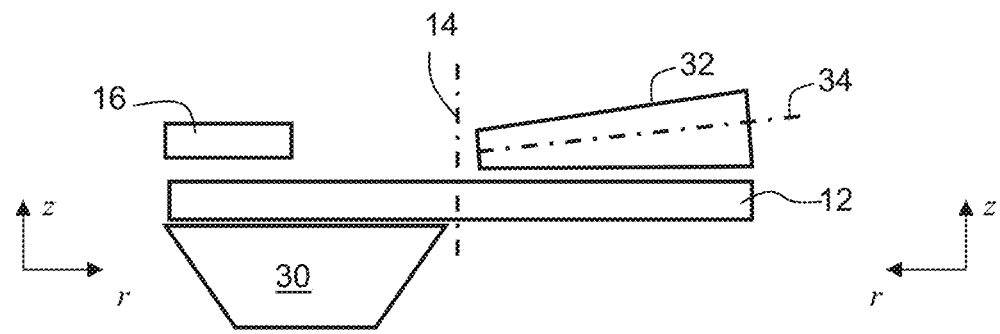
Figure 1D:
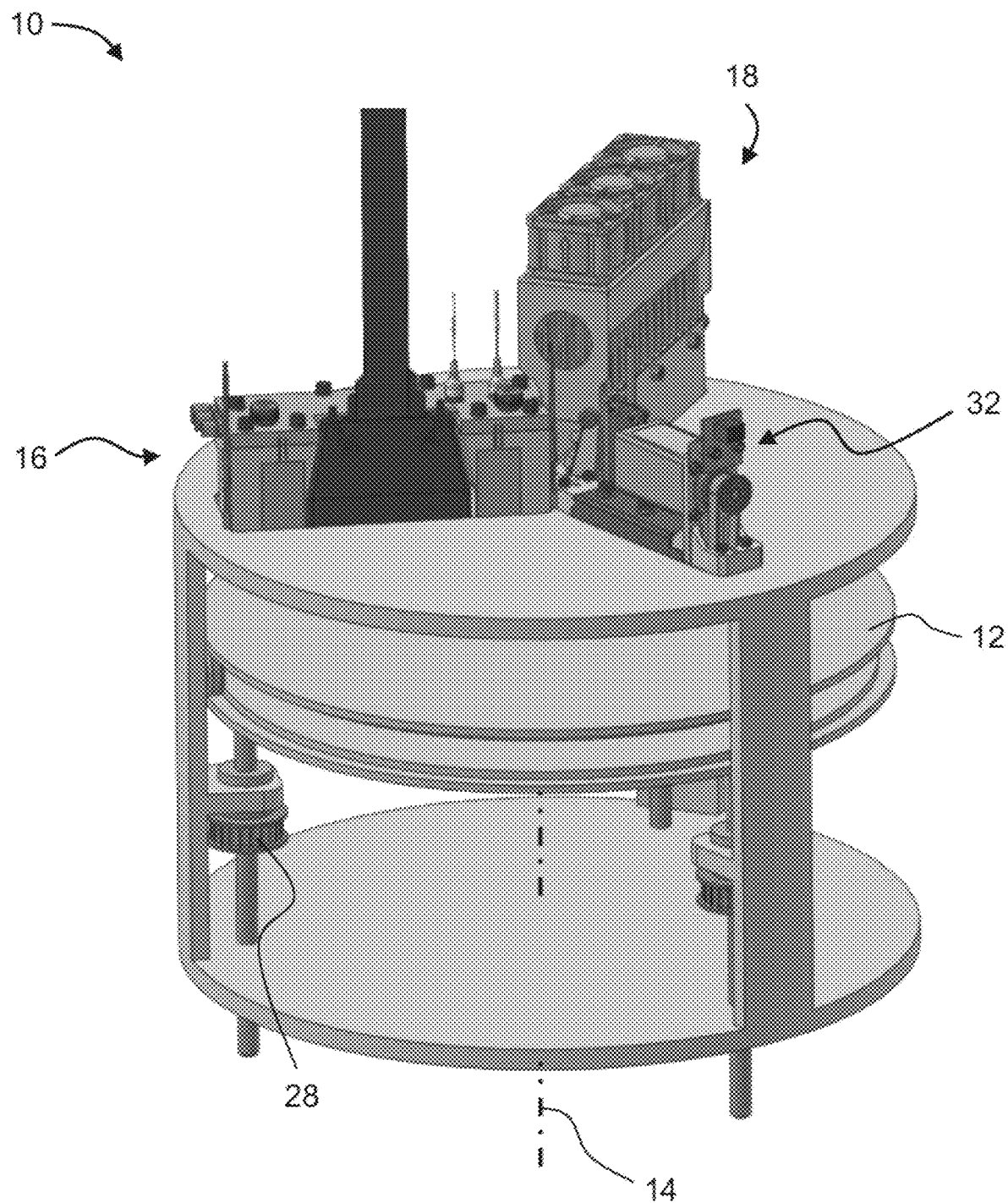

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having each having one or more arrays of nozzles with respective one or more pluralities of separated nozzles. Tray 12 can have a shape of a disk or it can be annular. Non-round shapes are also contemplated, provided they can be rotated about a vertical axis. Printing heads 16 can be any of the printing heads described above with respect to system 110.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layer-wise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY), 3D Manufacturing Format (3MF), Object file format (OBJ), or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
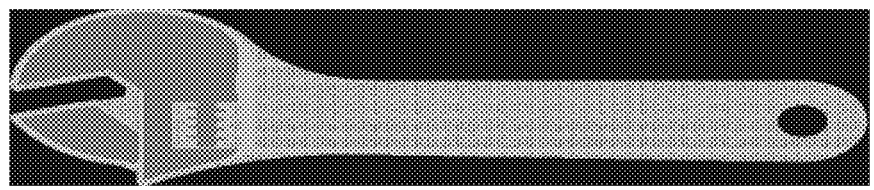
FIGS. 3A and 3B are schematic illustrations demonstrating coordinate transformations according to some embodiments of the present invention.
Figure 3B:
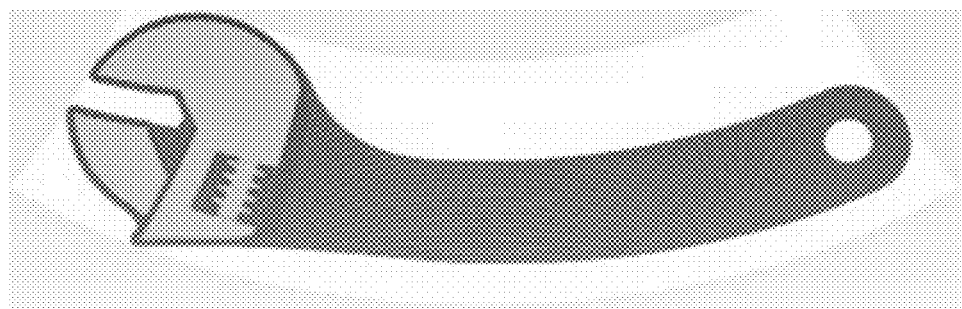

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. In exemplary embodiments, the radiation source is LED. Radiation source 18 serves for curing or solidifying the modeling and/or support material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 2C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Further details on the principles and operations of an AM system suitable for the present embodiments are found in U.S. Pat. No. 9,031,680, and International Publication No. WO 2016/009426, the contents of which are hereby incorporated by reference.

The present embodiments thus enable the deposition of a broad range of material combinations, and the fabrication of an object which may consist of multiple different combinations of materials, in different parts of the object, according to the properties desired to characterize each part of the object.

Figure 4:
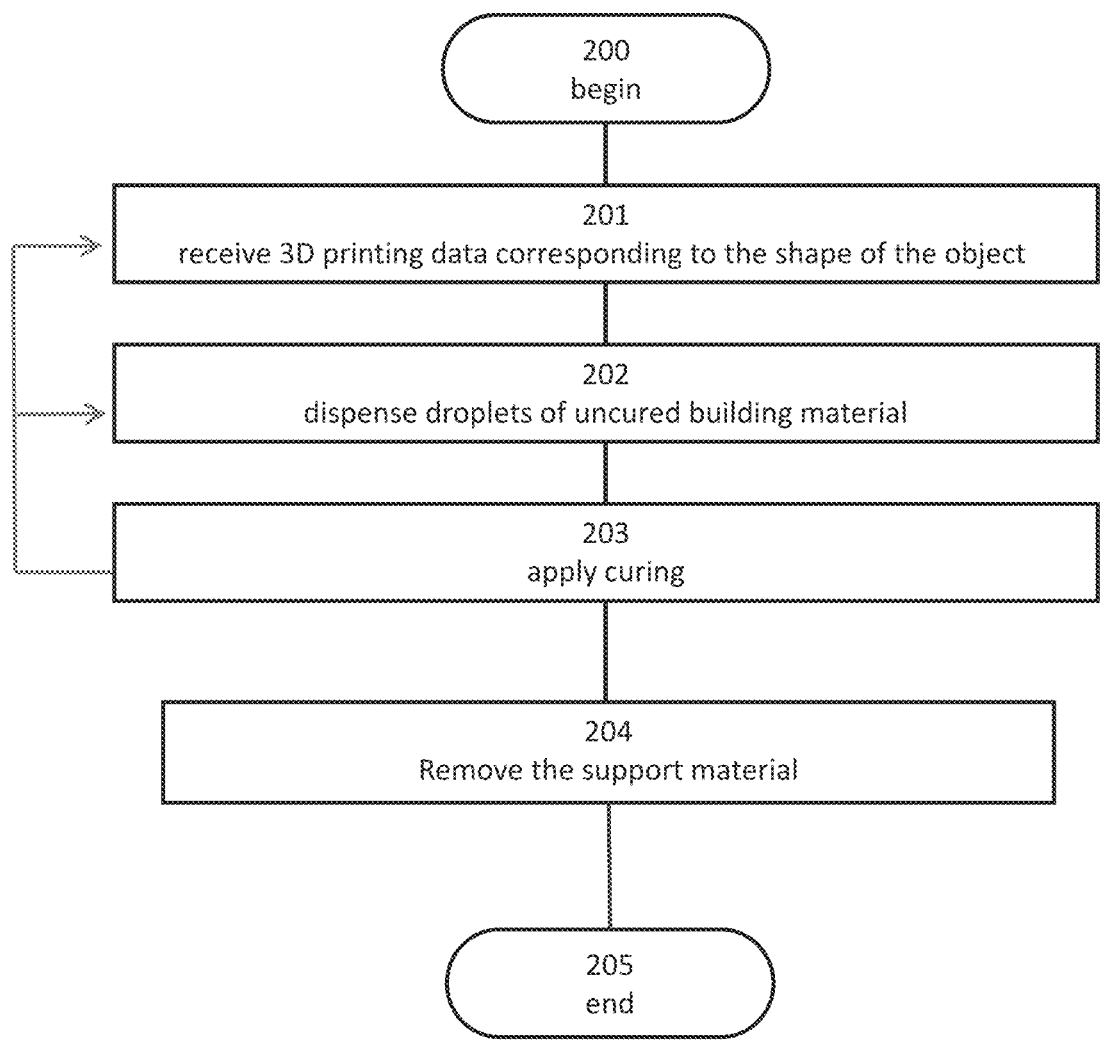
FIG. 4 is a flowchart diagram of a method suitable for AM of a three-dimensional object according to various exemplary embodiments of the present invention.

FIG. 4 is a flowchart diagram of a method of additive manufacturing of a three-dimensional object according to some embodiments of the present invention. The method begins at 200 and optionally and preferably proceeds to 201 at which 3D printing data in any of the aforementioned computer object data formats are obtained.

The method can proceed to 202 at which droplets of one or more uncured building material formulation(s) are dispensed to form a layer. The building material formulation comprises a modeling material formulation as described herein and a support material formulation as described herein in any of the respective embodiments and any combination thereof.

The modeling material formulation is preferably dispensed in a configured pattern corresponding to the shape of the object and in accordance with the computer object data. The other building material formulations are preferably dispensed in accordance with the computer object data, but not necessarily in accordance with the shape of the object, since these building material formulations are typically sacrificial (serving as a support material as described herein).

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 30 centipoises, preferably about 25 centipoises and more preferably about 20 centipoises, or 18 centipoises, or 16 centipoises, or 14 centipoises, or 12 centipoises, or 10 centipoises, or even lower. It is to be noted that higher viscosities can also be applicable, particularly, but not obligatorily, in cases where the inkjet printing head is adapted for dispensing high viscosity formulations. Thus, also contemplated is heating the formulation(s) to a temperature at which the respective formulation exhibits a viscosity of up to 100, 150 and even 200 centipoises.

The heating can be executed before loading the respective formulation into the printing head of the AM (e.g., 3D inkjet printing) system, or while the formulation is in the printing head or while the composition passes through the nozzle of the printing head.

In some embodiments, the heating is executed before loading of the respective formulation into the dispensing (e.g., inkjet printing) head, so as to avoid clogging of the dispensing (e.g., inkjet printing) head by the formulation in case its viscosity is too high.

In some embodiments, the heating is executed by heating the dispensing (e.g., inkjet printing) heads, at least while passing the modeling material formulation(s) through the nozzle of the dispensing (e.g., inkjet printing) head.

In some embodiments, a newly dispensed layer is optionally straightened, for example, using a leveling device 32 or 132, which is optionally and preferably rotatable.

The method optionally and preferably proceeds to 203 at which the deposited layer is exposed to a curing condition (e.g., curing energy is applied), e.g., by means of a hardening device, for example, a radiation source as described herein. Preferably, the curing is applied to each individual layer following the deposition of the layer and prior to the deposition of the previous layer. Optionally, the deposited (dispensed) layers are exposed to the curing condition other than a curing energy, such as, but not limited to, contact with a chemical reagent or exposure to the environment.

Operations 202-203, and in some embodiments also 201, are preferably executed sequentially a plurality of times so that a plurality of layers are sequentially dispensed and solidified. This is illustrated in FIG. 4 as loop back arrows pointing from operation 203 to operations 201 and 202. The layers are dispensed to form a stack of model layers made of a modeling material formulation, and a sacrificial structure made of a support material formulation such as described herein, wherein the stack of model layers and the sacrificial structure are separable from each other in a manner that maintains the shape and size of the stack of model layers without deformation.

In some embodiments of the present invention the method dispenses digital material formulation for at least one of the layers.

The phrase "digital material formulations", as used herein and in the art, describes a combination of two or more material formulations that are interlaced with each other such that the printed zones of a specific material formulation occupy a voxel, or few voxels, or a voxel block, at least partially surrounded by a voxel, or few voxels, or a voxel block of another material formulation. Such digital material formulations may exhibit new properties that are affected by the selection of types of material formulations and/or the ratio and relative spatial distribution of two or more material formulations.

In exemplary digital material formulations, the modeling or support material formulation of each voxel or voxel block, obtained upon curing, is independent of the modeling or support material formulation of a neighboring voxel or voxel block, obtained upon curing, such that each voxel or voxel block may result in a different modeling or support material formulation and the new properties of the whole object are a result of a spatial combination, on the voxel level, of several different model material formulations.

In various exemplary embodiments of the invention operations 202-203 are executed to form, for at least a portion of layers, voxel elements containing different building material formulations at interlaced locations.

In some embodiments, at least one, or at least a few (e.g., at least 10, at least 20, at least 30 at least 40, at least 50, at least 60, at least 80, or more), of the layers is/are formed by dispensing droplets of two or more building material formulations at interlaced locations, each building material formulation from a different nozzle array. These building material formulations can include: (i) two or more modeling material formulations as described herein in any of the respective embodiments, (ii) at least one modeling material formulation and at least one support material formulation as described herein in any of the respective embodiments, or (iii) two or more support material formulations as described herein in any of the respective embodiments.

In some embodiments, the method continues to 204, at which the hardened support material is removed from the printed object, to thereby reveal the final object. The removal 204 can be in more than one way.

In some embodiments of the present invention the removal 204 is by contacting the printed object with water, or an aqueous solution. Preferably, the aqueous solution is detergent free. Preferably, the aqueous solution does not comprise an alkaline substance.

The contacting can be made by immersing the printed object in static water or aqueous solution, or by immersing the printed object in circulating water, for example, a Jacuzzi, or by immersing the printed object in ultrasonic water bath, or by subjecting the printed object to mechanical dishwashing in detergent-free water or aqueous solution.

The method ends at 205.

According to an aspect of some embodiments of the present invention, there is provided a three-dimensional model object prepared by the method as described herein, in any of the embodiments thereof and any combination thereof.

According to an aspect of some embodiments of the present invention there is provided a 3D model object as described herein.

According to some embodiments of the present invention, the object is characterized as featuring a uniform appearance, e.g., a uniform "glossy" appearance or a uniform "matte" appearance, independently of the mode in which it was manufactured.

As used herein the term "about" refers to +10% or +5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "water-miscible" describes a material which is at least partially dissolvable or dispersible in water, that is, at least 50% of the molecules move into the water upon mixture at room temperature. This term encompasses the terms "water-soluble" and "water dispersible".

Herein throughout, the term "water-soluble" describes a material that when mixed with water in equal volumes or weights, at room temperature, a homogeneous solution is formed.

Herein throughout, the term "water-dispersible" describes a material that forms a homogeneous dispersion when mixed with water in equal volumes or weights, at room temperature.

Herein throughout, the term "branching unit" describes a multi-radical group, which can be aliphatic, alicyclic or aromatic. By "multi-radical" it is meant that the unit has two or more attachment points such that it links between two or more atoms and/or groups or moieties.

In some embodiments, the branching unit is derived from a chemical moiety that has two, three or more functional groups. In some embodiments, the branching unit is a branched alkyl or a cycloalkyl (alicyclic) or an aryl (e.g., phenyl) as defined herein.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R" group wherein R" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O— thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O— thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a —Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Support Material Formulation Design

In a search for support material formulations that provide a hardened support material that can be readily removed when immersed in or is contacted with water (preferably detergent-free water) while not affecting the appearance (e.g., glossy appearance; fine details, etc.) of portions of a printed objected that contacted the support material during manufacturing, the present inventors have conceived manipulating the non-curable components of a support material formulation.

The present inventors have tested ample formulations based on a hydrophilic curable mono-functional (monomeric) material, as described herein, and a polyol, while manipulating the nature of the polyol (its molecular weight, linearity), and while testing the effect of various non-curable additives in varying amounts.

While most of the tested formulations failed for either leaching or melting during the 3D printing process, contaminating the roller, detaching from the model material (poor adherence to the hardened model material) and/or resulting in matte appearance of the respective portions, the present inventors have uncovered that when using a certain combination and type of a polyol and a polyester, at certain concentration ranges, a hardened support material that can be readily removed without adversely affecting the printing process and the object appearance can be obtained.

More specifically, the present inventors have uncovered that a good performance is obtained for a formulation that comprises a hydrophilic curable mono-functional (monomeric) material, as described herein, a polyol having a molecular weight of from about 400 to about 1000 grams/mol, preferably such a polyol which is a branched polyol, and a polyester material having a molecular weight higher than 400, or higher tyhan 500, grams/mol, which is liquid at room temperature (e.g., having a melting point lower than the process temperature, preferably lower than room temperature) or that is dissolvable and/or stable in the formulation at room temperature (does not crystallize, precipitate or aggregate). Such a formulation is characterized by a suitable viscosity at the jetting temperature (e.g., 70° C.), namely, lower than 20 or lower than 15 centipoises (when measured on Brookfield viscometer); a good adhesion to the hardened model material during the manufacturing process; a good compatibility with the system during manufacturing (e.g., no leaching, melting and roller contamination); and no adverse effect on the object appearance.

The present inventors have further uncovered that a weight ratio of the polyol to the polyester, which is lower than 4:1 or lower than 3:1, e.g., ranges from 2:1 to 3:1, is preferred.

Example 2

Experimental Data

Table 1 below presents exemplary support material formulations that were tested when searching for an improved formulation, and the performance thereof. Performance is marked as good for formulations featuring no detachments from (good adhesion to) the model material, good surface quality and good printability, the latter being characterized for instance by substantially no leaching, no melting and no roller contamination. Performance is marked as "0" and considered as "failed" when one of the above parameters was not fulfilled.

The performance of the tested formulations relates to 3D inkjet printing in a J55 system (Stratasys Ltd., Israel) in combination with Vero™ modeling material formulation (e.g. VeroBlackPlus™). Removal of the hardened support material was performed by immersion in static water for 1 to several hours.

TABLE 1

| Formulation No. | Hydrophilic curable monomer | Branched polyol (MW) | Linear polyol (MW) | Glycerol | Polyester | Inhibitor | PI | Performance |
|---|---|---|---|---|---|---|---|---|
| 1 | 40-50 | X | 30-40 (600) | 10-30 | X | 0.01-2 | 0.5-2 | 0 |
| 2 | 40-50 | X | 30-40 (600) + 10-20 (4000) | X | X | 0.01-2 | 0.5-2 | 0 |
| 3 | 40-50 | 35-40 (700) | X | X | 10-20 | 0.01-1 | 0.5-2 | +++ |
| 4 | 40-50 | 35-40 (1000) | X | X | 10-20 | 0.01-1 | 0.5-2 | 0 |
| 5 | 40-50 | 40-45 (700) | X | X | 10-20 | 0.01-1 | 0.5-2 | +++ |
| 6 | 40-50 | 35-40 (700) | X | X | 5-10 | 0.01-1 | 0.5-2 | 0 |
| 7 | 40-50 | X | 35-40 (900) | X | 10-20 | 0.01-1 | 0.5-2 | 0 |
| 8 | 40-50 | X | 30-40 (600) | X | 10-20 | 0.01-1 | 0.5-2 | ++ |

It can be seen that selecting a combination of a polyol, preferably a branched polyol, that features MW lower than 1,000 grams/mol and a polyester material, at certain amounts and/or ratio, provides for improved performance.

The hardened support material obtained while using a formulation according to the present embodiment was successfully removed when immersed in static water at room temperature, when immersed in a bath with circulating water (Jacuzzi) at room temperature, when immersed in water at 40° C. while applying sonication and when put in a dishwasher with detergent-free water at 40° C. (data not shown).

Figure 5:
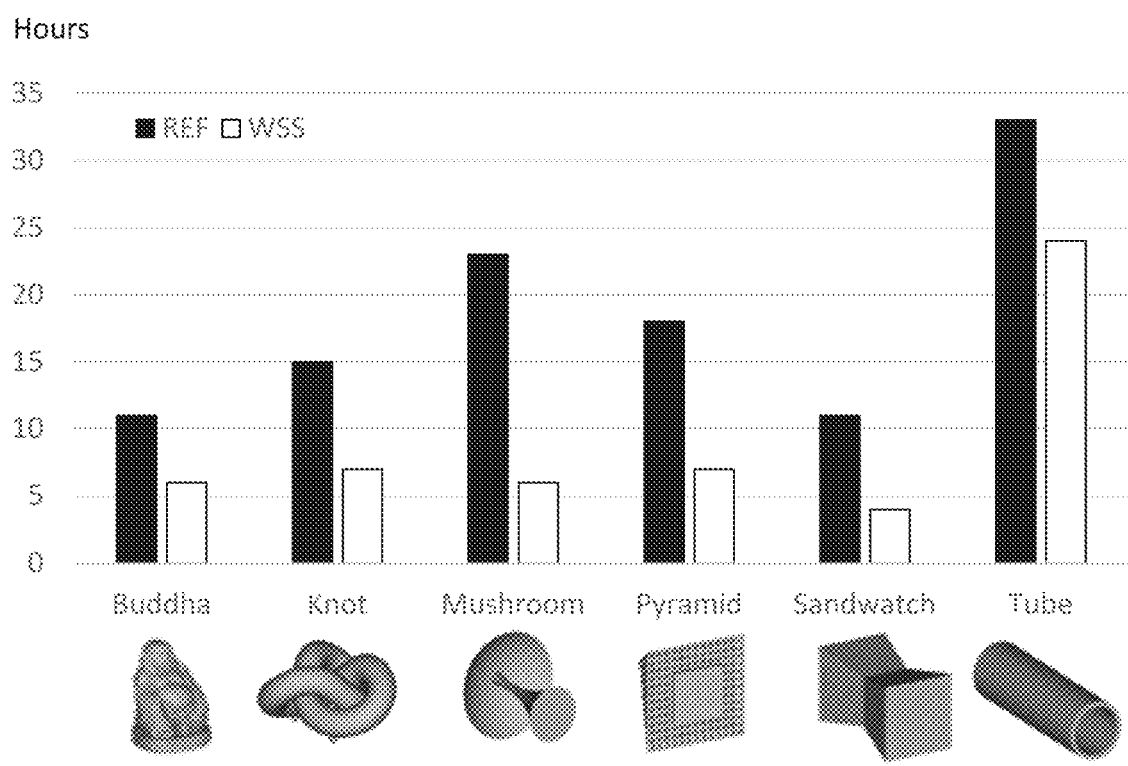
FIG. 5 is a bar graph showing dissolution times of a reference support material and an exemplary water soluble support material according to some embodiments of the present invention.

FIG. 5 is a bar graph showing the dissolution time (in hours) of a reference support material (hardened), denoted "REF" and an exemplary support material according to the present embodiments, denoted "WSS", in a jacuzzi with liquid circulation, from identical printed models fabricated on a J55 system.

Figure 6:
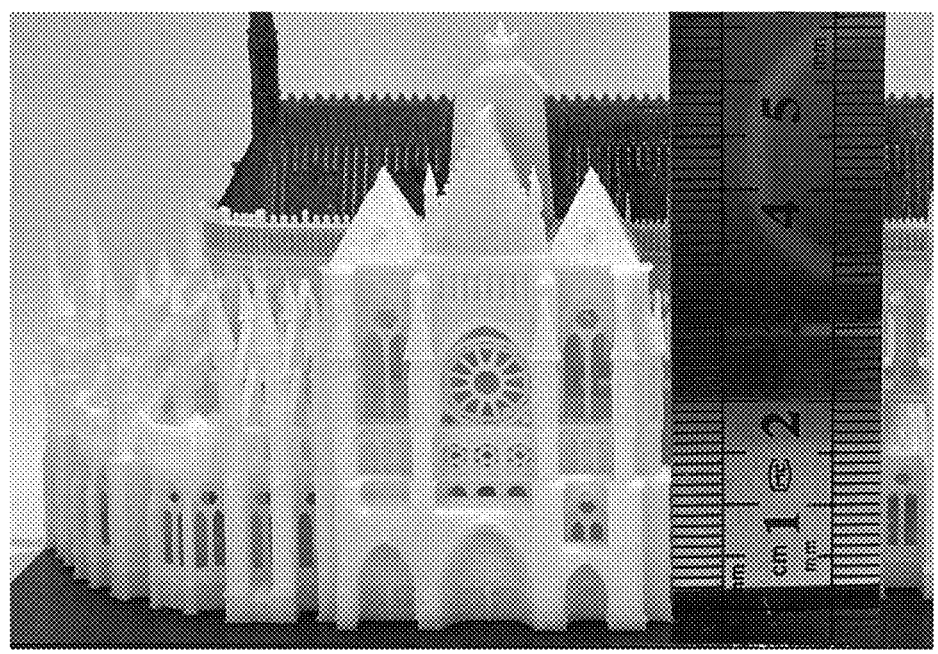
FIG. 6 is a photograph of an object featuring fine detail elements obtained using an exemplary water soluble support material formulation according to the present invention, after removal of the hardened support material.

FIG. 6 is a photograph of an object featuring fine detail elements obtained using an exemplary support material formulation according to the present embodiments, upon removal of the hardened support material. The modeling material used is from one of the families marketed by Stratasys under the trademark Vero® and VeroUltra™. Such a model type is typically either broken during support removal or cannot be seen in such detail at all (due, for example, presence of support residues that could have not been removed).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A support material formulation for use in additive manufacturing of a three-dimensional object, the formulation comprising:
   a hydrophilic curable mono-functional material;
   a polyol having a molecular weight lower than 800 grams/mol; and
   a polyester material having an average molecular weight higher than 400 grams/mol,
   wherein an amount of said polyester material ranges from 10 to 20% by weight of the total weight of the formulation,
   the support material formulation being characterized as providing a hardened material that is dissolvable when immersed in static water at room temperature.

2. The support material formulation of claim 1, wherein said polyester material is liquid at room temperature or is soluble in the formulation at room temperature.

3. The support material formulation of claim 1, wherein said polyester material is or comprises a polycaprolactone.

4. The support material formulation of claim 1, wherein said polyol is a branched polyol.

5. The support material formulation of claim 1, wherein a weight ratio of said polyol to said polyester material is no more than 4:1.

6. The support material formulation of claim 1, wherein a weight ratio of said polyol to said polyester material ranges from about 3:1 to about 2:1.

7. The support material formulation of claim 1, wherein an amount of said polyol ranges from 30 to 60% by weight of the total weight of the formulation.

8. The support material formulation of claim 1, wherein said polyol is a branched poly (alkylene glycol).

9. The support material formulation of claim 1, wherein said hydrophilic curable material is a photocurable material.

10. The support material formulation of claim 9, further comprising a photoinitiator.

11. The support material formulation of claim 10, wherein an amount of said photoinitiator ranges from 0.5 to 3% by weight of the total weight of the formulation.

12. The support material formulation of claim 1, further comprising a surface active agent and/or a polymerization inhibitor.

13. A method of manufacturing a three-dimensional object, the method comprising:
   receiving three-dimensional printing data corresponding to the shape of the object;
   dispensing droplets of an uncured building material in layers, on a receiving medium, using at least one inkjet printing head, according to said printing data,
   said uncured building material comprising at least one modeling material formulation and at least one support material formulation, said support material formulation being a formulation according to claim 1.

14. The method of claim 13, further comprising, subsequent to said dispensing, exposing said layers to a curing condition, to thereby provide a hardened modeling material and a hardened support material.

15. The method of claim 14, further comprising removing said hardened support material.

16. The method of claim 15, wherein removing said hardened support material is by immersion in static water.

17. The method of claim 16, wherein removing said hardened support material is by immersion in circulating water.

18. The method of claim 15, wherein removing said hardened support material is by immersion in a water bath and applying sonication to the water bath.

19. The method of claim 15, wherein removing said hardened support material is by dishwashing using detergent-free water.

* * * * *